May 29, 1951  J. C. RHOADS  2,555,003
PINION AND GEAR AXLE DRIVE AND LUBRICATION SYSTEM THEREFOR
Filed Oct. 18, 1946  3 Sheets-Sheet 1

Inventor:
James C. Rhoads,
by  *Crowell S. Hack*
His Attorney.

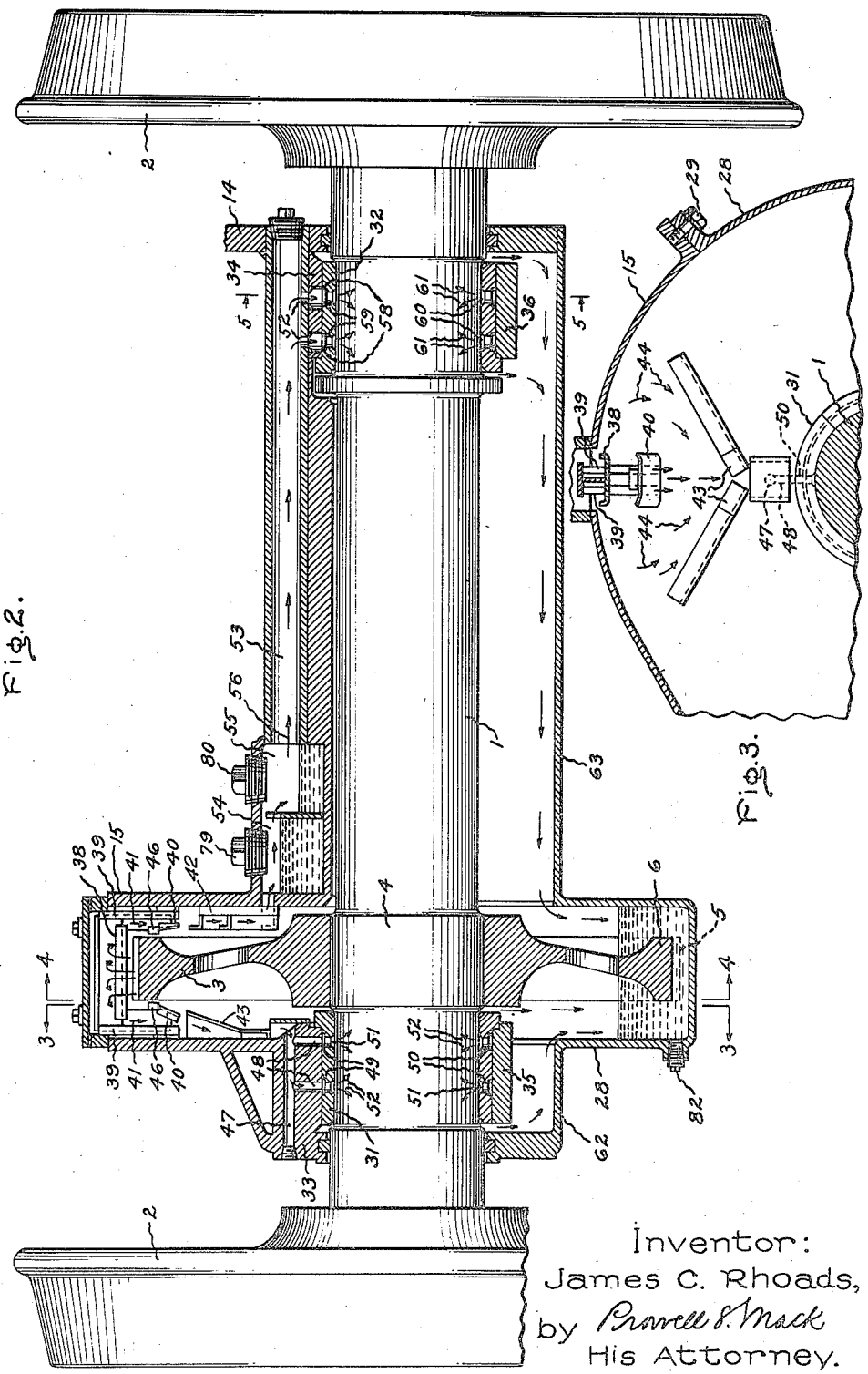

May 29, 1951  J. C. RHOADS  2,555,003
PINION AND GEAR AXLE DRIVE AND LUBRICATION SYSTEM THEREFOR
Filed Oct. 18, 1946  3 Sheets-Sheet 3

Inventor:
James C. Rhoads,
by Prowell S. Mack
His Attorney.

Patented May 29, 1951

2,555,003

UNITED STATES PATENT OFFICE 2,555,003

PINION AND GEAR AXLE DRIVE AND LUBRICATION SYSTEM THEREFOR

James C. Rhoads, Erie, Pa., assignor to General Electric Company, a corporation of New York Application October 18, 1946, Serial No. 703,961

4 Claims. (Cl. 184—11)

1

My invention relates to geared axle drives and particularly to an improved construction for providing efficient lubrication to the axle driving gears and the support for the gears and the gear casing on the axle.

An object of my invention is to provide an improved axle driving construction provided with an efficient lubricating system.

Another object of my invention is to provide an improved lubricating system for a geared axle drive.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
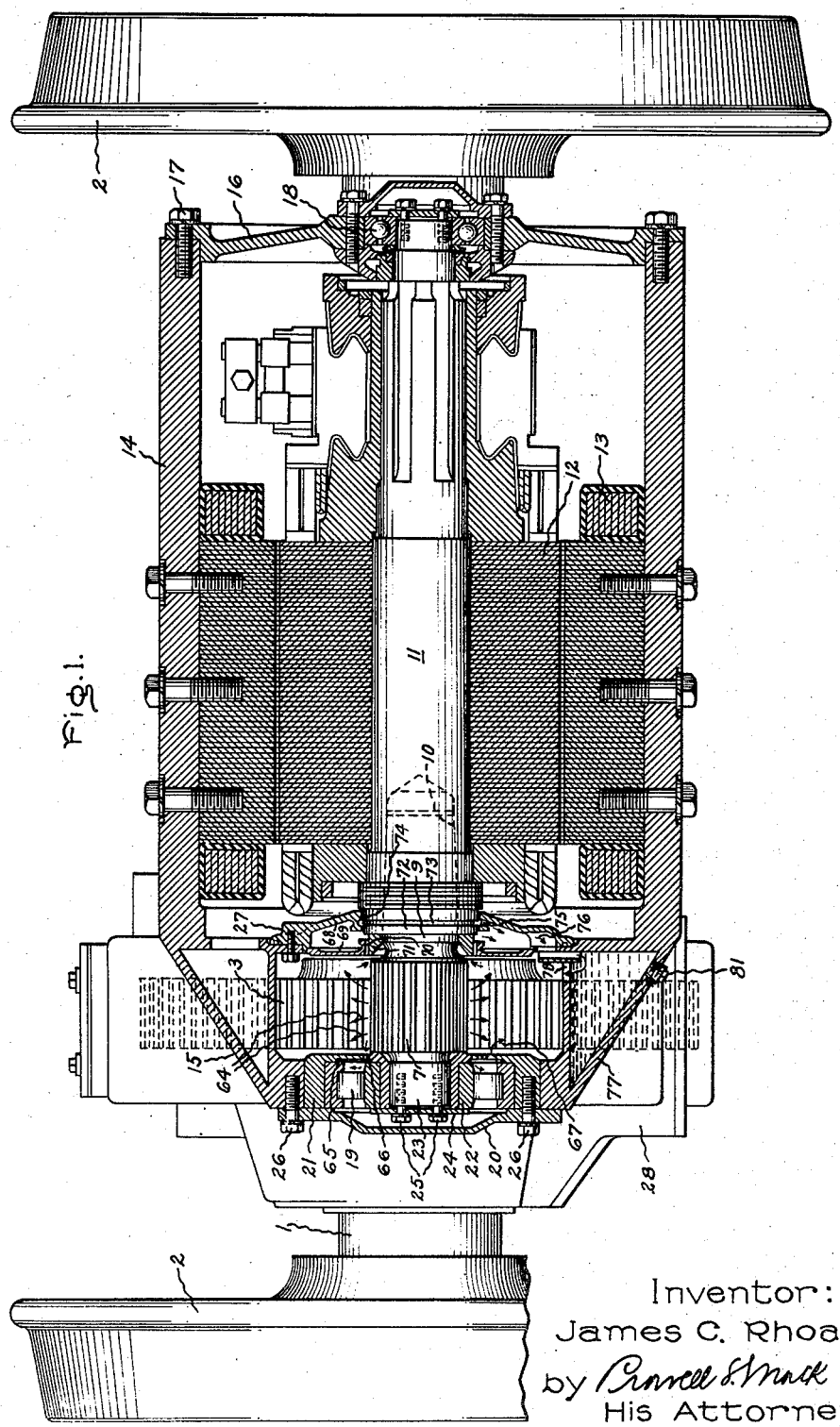
Figure 4:
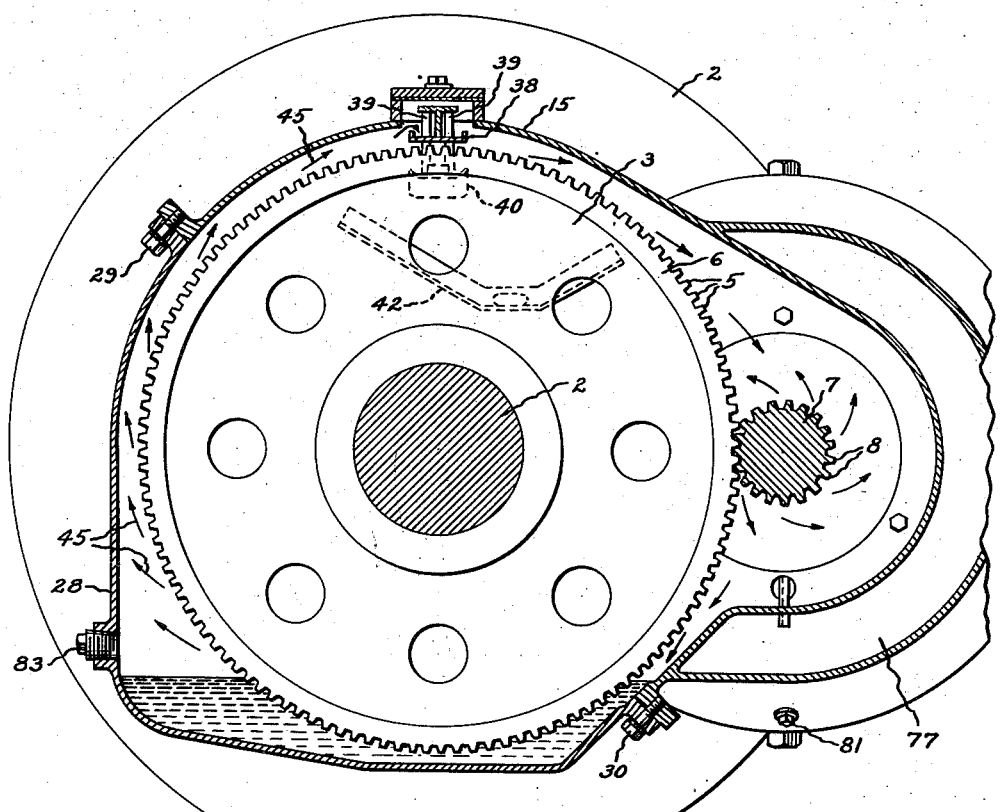
Figure 5:
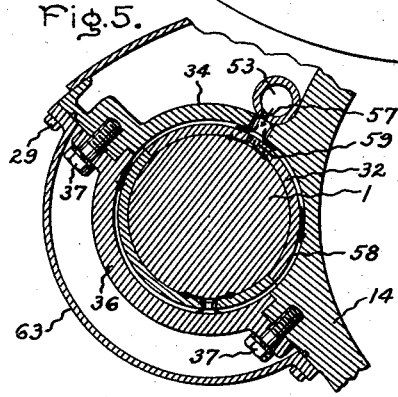

In the drawings, Fig. 1 is an elevational view, partly in section, of a motor and gear drive for an axle which illustrates an embodiment of my invention; Fig. 2 is an elevational view, partly in section, through the gear and lubricating system directly cooperating with the driven axle shown in Fig. 1; Fig. 3 is a sectional view taken along line 3—3 of Fig. 2; Fig. 4 is a sectional view taken along line 4—4 of Fig. 2; and Fig. 5 is a sectional view taken along line 5—5 of Fig. 2 illustrating the lubricating and bearing construction at this point.

Referring to the drawings, I have shown a railway vehicle driving axle 1 on which driving wheels 2 are mounted and which is adapted to be driven by an axle gear 3 which is operatively connected to the axle in any suitable manner, as by being shrunk on a collar 4 formed on the axle 1. This axle gear 3 is provided with a plurality of gear teeth 5 formed on the outer periphery of a rim 6 and is adapted to be driven by a spur gear 7 having gear teeth 8 which mesh with the gear teeth to provide an operative connection therebetween. The spur gear 7 is formed with a stub shaft 9 which forms a driving fit with a complementary conical opening 10 formed in an end of a shaft 11 of an electric driving motor of any suitable type. The motor illustrated in Fig. 1 may be any conventional type traction motor and is shown as including an armature 12 and pole pieces 13 mounted in a magnet frame 14 which also forms a casing or housing 15 for the driving spur gear 7 and the axle gear 3. This unitary motor frame and gear casing minimizes the parts which need be connected together by removable connecting elements, such as bolts, and thereby

2 minimizes the possibility of noise and damage which might result from vibration to which the equipment is subjected in normal use. Furthermore, this provides for a simplified design of the axle driving construction housing. As shown more clearly in Fig. 1, the motor is provided with an end shield 16 at one end which is secured by a plurality of bolts 17 to the magnet frame 14 and which is arranged to support a suitable bearing 18 of the antifriction type for one end of the motor shaft 11. The other end of the motor shaft 11 is supported by the stub shaft 9 of the driving spur gear 7, and this spur gear is supported by an antifriction bearing, shown as comprising a roller bearing 19 which is mounted in a bearing housing formed by a cap 20 and a retaining cup member 21 secured in an opening in the end of the gear casing 15. The roller bearing 19 is provided with an inner race 22 which is secured in position around a projecting stub shaft portion 23 of the driving spur gear 7 by a cover plate 24 secured to the stub shaft portion 23 by a plurality of bolts 25. The motor armature 12 together with the driving pinion gear 7 may be removed from the motor housing for inspection or repairs by removing the end shield 16 from the magnet frame 14 by removing the bolts 17. The armature 12, together with the driving pinion 7 secured thereto, may be withdrawn from the motor frame through the end shield 16 end of the frame, as an opening through a lubricating seal 27, which is arranged between the driving spur gear 7 and the armature 12 for preventing the passage of lubricant from the gear casing 15 into the motor frame portion 14, is made sufficiently large to provide a clearance around the driving spur gear 7 and permit its withdrawal axially through the central opening in the seal member 27 without interference therewith.

With modern high speed drives, considerable difficulty is encountered in providing adequate and efficient lubrication to the various contacting surfaces of the gears and the bearings of this type of equipment. In the illustrated construction, the gear casing includes the portion 15 which is formed integral with the motor magnet frame 14 and also includes a demountable portion 28 which is removably secured to the casing portion 15 by a plurality of bolts 29 and 30 and forms a protective housing around the gears and also provides a lubricant reservoir for such gears. This gear casing and the magnet frame 14 are supported on the axle 1 by a pair of bearings 31 and 32 arranged one adjacent each end of the axle 11. These bearings are formed as sleeve bearings which are mounted in bearing housing portions 33 and 34 of the casing 15 and magnet frame 14 and retained in position by bearing caps 35 and 36 which are removably secured to the housing portions 33 and 34 by a plurality of bolts 37, as shown in Fig. 5. Such a construction, together with the unitary gear casing 15 and motor magnet frame 14, enables the provision of a maximum size motor and gear for a given axial length and provides for a more efficient utilization of the space between the driving wheels 2 which, in most instances, is limited to standard railway gage or to some other predetermined length.

Effective lubrication of all of the bearings for the gears and of the engaging surfaces of the gears as well as the bearings which support the gear casing and mounting frame on the axle is obtained by a lubricant supply and circulating system which utilizes the rotation of the axle gear 3 to transfer lubricating oil from the gear case reservoir 28 into the lubricant distributing system. To obtain the desired supply of lubricating oil, a floating receiving trough 38 is mounted on supports 39 secured to the side of the gear case 15 and each end thereof is secured over a directing funnel or trough 40, such that oil splashed into the receiving trough 38 as indicated by arrows 41 drains out at the ends into the troughs 40 from which it flows into collecting troughs 42 and 43 on the sides of the gear casing. These collecting troughs 42 and 43 also collect oil which is splashed or thrown on the sides of the gear casing by the gear 6, as indicated by arrows 44 and 45. In order to assure an adequate circulation of lubricant, the troughs 40 are formed with scraper or wiper blades 46 which are arranged with a close clearance against the sides of the gear 6 for the removal and collection of oil therefrom which is also guided into the troughs 40. Thus, the rotation of gear 6 in the lubricating oil in the reservoir 28 provides for the supply of lubricating oil to the engaging teeth of the two gears 3 and 7 and also acts to pump lubricant over the sides of the gear casing 15, into a lubricant receiving trough 38, and into directing troughs from the receiving trough 38 by the action of the wiper blades 46. A distribution channel 47 is formed in the bearing housing end 33 of the gear casing 15 and is arranged to receive lubricant which has been collected in the adjacent trough 40 and to distribute such lubricant through passages 48 to oil grooves 49 formed on the outer peripheral surface of the bearing 31, from which it passes through a plurality of openings 50 in the bearing to oil grooves 51 in the inner peripheral face of the bearing and is distributed as shown by the arrows 52 over the surface of the bearing 31 and the complementary engaging surface of the axle 1. Lubricant is adapted to be supplied to the bearing 32 by passing from the collecting trough 40 on the near side of the gear casing 15 into a distributing channel 53 formed with a pair of settling chambers 54 and 55 through which the lubricant passes, as indicated by the arrows 56 and is delivered through a plurality of openings 57 into lubricant distributing oil grooves 58 formed in the outer periphery of the bearing 32, from which it passes through a plurality of openings 59 to inner oil grooves 60 and is distributed over the inner peripheral surface of the bearing 32 and the complementary cylindrical surface of the axle 1, as indicated by the arrows 61. Excess lubricant is adapted to pass from the ends of both of the bearings 31 and 32, as indicated by the arrows in Fig. 2, and to pass axially along collecting troughs 62 and 63 respectively into the lower reservoir portion 28 of the gear casing which forms the lubricant reservoir for the system.

The lubricating oil which is carried to the teeth of the gear 7 is partially thrown off, as indicated in Fig. 1 by the arrows 64, and a certain amount of this lubricating oil impinges on the inner wall 65 of the bearing supporting cup 21 and passes through a plurality of metering openings 66 formed in this wall. Excess lubricant which may pass into the roller bearing 19 drains therefrom through the lower openings 66 in the wall 65 and is returned, as indicated by the arrows 67 into the lubricant reservoir lower portion 28 of the gear casing.

With such a construction, it is desirable that the lubricating oil should be prevented from passing along the shaft 11 of the motor armature and into the motor, as it might deleteriously affect the insulation of the motor winding. In order to prevent such passage of lubricant into the motor, a lubricant seal 27 is provided between the gear casing 15 and the magnet frame 14 and includes a pair of walls 68 and 69 which are spaced apart and form a lubricant drain chamber therebetween. The inner ends of both of these walls are formed with openings which extend around cylindrical portions of the shaft 11 to provide a labyrinth seal therewith. In this construction, the lubricating oil which is splashed against the gear casing side of the seal wall 69 is utilized to provide a liquid seal for preventing the passage of undesirable fumes or oil laden vapors from the gear casing into the motor housing. This is obtained by forming a close clearance between an inner cylindrical axially extending portion 70 of the wall 69 about a cylindrical portion 71 of a ring mounted on the armature shaft 11. Lubricating oil which passes through this clearance is substantially all thrown off into the lubricant drain chamber between the seal walls 68 and 69 by the sharp edge of a flinger shoulder 72 formed on the shaft 11, and any lubricant which passes this shoulder 72 is adapted to be thrown off by a flinger groove 73 cut into the shaft 11 and to be collected in a lubricating oil drain groove 74 formed on an inner cylindrical surface of the seal wall 68. Excess lubricant which is collected in the drain groove 74 passes to the lower portion thereof and through a drain opening 75 which extends from the drain groove 74 into the drain chamber between the seal walls 68 and 69. Thus, the lubricating oil is utilized to form a liquid seal and is prevented from passing along the motor shaft 11 by being collected in the drain chamber of the seal 27. This collected lubricating oil then passes, as indicated by the arrows 76, from the lower portion of the drain chamber into an auxiliary reservoir or settling chamber 77 formed in the lower portion of the gear casing 15 below the driving spur gear 7, such that foreign particles which may be entrained in this lubricating oil will be deposited in the lower portion of this settling chamber. The excess lubricant will flow from this settling chamber 77 through an opening 78 in the upper portion thereof and return into the lubricant reservoir formed by the lower portion 28 of the gear casing. Thus, substantially all of the lubricating oil which passes to the bearings is clarified in its circulation through the system, parts being clarified by the settling chambers 54 and 55, and the remaining portion of the lubricating oil which passes to the driving gear 7, the bearing 19, and the seal 27 is clarified by passage into the settling chamber 77. Undesirable foreign material and sludge may be removed from the settling chambers 54, 55, and 77 by removal of oil plugs 79, 80, and 81, respectively, and the main lubricant reservoir may also be drained by removing drain plugs 82 and 83 in the lower portion thereof. In this manner, the gears are provided with adequate and efficient lubrication during operation of the driving axle 1, and the various bearings also are properly lubricated by the oil distribution system which cooperates with the axle gear 3 in pumping the lubricant to the various bearings.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An axle driving construction including an axle, a gear operatively connected to said axle, a driving gear operatively connected to said axle gear, means including an electric motor for operating said driving gear, means including a common casing for said driving and axle gears arranged around said gears for providing a protective housing and lubricant reservoir therefor, a bearing adjacent each end of said axle for supporting said casing thereon, a bearing in said casing for supporting said driving gear, means cooperating with said axle gear on rotation thereof for supplying lubricant from said reservoir to said bearings and to said driving gear, said lubricant supply means including channels for distributing lubricant to said axle bearings and a receiving trough adjacent the upper portion of said casing for receiving lubricant delivered thereto by rotation of said axle gear with a collecting trough at each side of said casing for collecting lubricant from said casing sides and for receiving collected lubricant from said upper receiving trough for delivery to said distributing channels, one of said distributing channels including settling chambers arranged between its respective associated collecting trough and its respective associated bearing, means for collecting excess lubricant from said bearings and returning the collected excess lubricant to said casing reservoir, said lubricant supply means including a bearing casing wall for said driving gear bearing having metering openings therein for supplying lubricant to said driving gear bearing and for returning excess lubricant to said casing reservoir, and means including a liquid seal utilizing lubricant as the liquid in said seal for preventing the flow of lubricant from said casing to said electric motor and returning said liquid seal lubricant to said casing reservoir.

2. An axle driving construction including an axle, a gear operatively connected to said axle, a driving gear operatively connected to said axle gear, means including an electric motor for operating said driving gear, means including a common casing for said driving and axle gears arranged around said gears for providing a protective housing and lubricant reservoir therefor, a bearing adjacent each end of said axle for supporting said casing thereon, a bearing in said casing for supporting said driving gear, means cooperating with said axle gear on rotation thereof for supplying lubricant from said reservoir to said bearings and to said driving gear, said lubricant supply means including channels for distributing lubricant to said axle bearings and a receiving trough adjacent the upper portion of said casing for receiving lubricant delivered thereto by rotation of said axle gear with a collecting trough at each side of said casing for collecting lubricant from said casing sides and for receiving collected lubricant from said upper receiving trough for delivery to said distributing channels, means for collecting excess lubricant from said bearings and returning the collected excess lubricant to said casing reservoir, said lubricant supply means including a bearing casing wall for said driving gear bearing having metering openings therein for supplying lubricant to said driving gear bearing and for returning excess lubricant to said casing reservoir, and means including a liquid seal utilizing lubricant as the liquid in said seal for preventing the flow of lubricant from said casing to said electric motor and returning said liquid seal lubricant to said casing reservoir.

3. An axle driving construction including an axle, a gear operatively connected to said axle, a driving gear operatively connected to said axle gear, means including an electric motor for operating said driving gear, means including a common casing for said driving and axle gears arranged around said gears for providing a protective housing and lubricant reservoir therefor, a bearing adjacent each end of said axle for supporting said casing thereon, a bearing in said casing for supporting said driving gear, means cooperating with said axle gear on rotation thereof for supplying lubricant from said reservoir to said bearings and to said driving gear, said lubricant supply means including channels for distributing lubricant to said axle bearings and collecting troughs on said casing for collecting lubricant delivered thereto by rotation of said axle gear for delivery to said distributing channels, means for collecting excess lubricant from said bearings and returning the collected excess lubricant to said casing reservoir, said lubricant supply means including a bearing casing wall for said driving gear bearing having metering openings therein for supplying lubricant to said driving gear bearing and for returning excess lubricant to said casing reservoir, and means including a liquid seal utilizing lubricant as the liquid in said seal for preventing the flow of lubricant from said casing to said electric motor and returning said liquid seal lubricant to said casing reservoir.

4. An axle driving construction including an axle, a gear operatively connected to said axle, a driving gear operatively connected to said axle gear, means including an electric motor for operating said driving gear, means including a common casing for said driving and axle gears arranged around said gears for providing a protective housing and lubricant reservoir therefor, a bearing adjacent each end of said axle for supporting said casing thereon, a bearing in said casing for supporting said driving gear, means cooperating with said axle gear on rotation thereof for supplying lubricant from said reservoir to said bearings and to said driving gear, said lubricant supply means including channels for distributing lubricant to said axle bearings and collecting troughs on said casing for collecting lubricant delivered thereto by rotation of said axle gear for delivery to said distributing channels, means for collecting excess lubricant from said bearings and returning the collected excess lubricant to said casing reservoir, and means including a liquid seal utilizing lubricant as the liquid in said seal for preventing the flow of lubricant from said casing to said electric motor and returning said liquid seal lubricant to said casing reservoir.

JAMES C. RHOADS.

REFERENCES CITED

The following references are of record in the file of this patent:

UNITED STATES PATENTS

| Number | Name | Date |
| --- | --- | --- |
| 679,971 | Kennedy | Aug. 6, 1901 |
| 1,334,547 | Melcher | Mar. 23, 1920 |
| 1,554,329 | Bull | Sept. 22, 1925 |
| 1,606,753 | Eaton | Nov. 16, 1926 |
| 1,623,728 | Hooton | Apr. 5, 1927 |
| 1,631,217 | Matthews | June 7, 1927 |
| 1,673,566 | Himes | June 12, 1928 |
| 1,995,288 | Acker | Mar. 26, 1935 |
| 2,242,195 | Teker | May 13, 1941 |
| 2,245,281 | Klopak | June 10, 1941 |
| 2,441,844 | Rhoads | May 18, 1948 |